United States Patent

Diez et al.

[11] Patent Number: 5,951,699
[45] Date of Patent: Sep. 14, 1999

[54] METHOD AND APPARATUS FOR VERIFYING INTEGRITY OF PREDEFINED DATA STRUCTURES IN A COMPUTER SYSTEM

[75] Inventors: Mark Fernando Diez; Chad Allen Olstad, both of Rochester; Gary Ross Ricard, Chatfield, all of Minn.

[73] Assignee: International Business Machines Corporation, Armonk, N.Y.

[21] Appl. No.: 08/862,497

[22] Filed: May 23, 1997

[51] Int. Cl.⁶ .................................................. G06F 12/14
[52] U.S. Cl. ............................................................. 714/38
[58] Field of Search ............................. 395/440, 425; 370/94.2; 714/38; 708/715.011

[56] References Cited

U.S. PATENT DOCUMENTS 5,293,600  3/1994  Vriezen ............................... 395/425
5,579,318  11/1996  Reuss et al. ........................ 370/94.2
5,584,007  12/1996  Ballard .............................. 395/440

Primary Examiner—Joseph E. Palys
Assistant Examiner—Omar A. Omar
Attorney, Agent, or Firm—Joan Pennington

[57] ABSTRACT

A method, apparatus and computer program product are provided for verifying integrity of predefined data structures in a computer system. A central software failure map is stored which includes for each of the predefined data structures a corresponding in-flux bit. The corresponding in-flux bit is set in response to a request to update one of the predefined data structures. Then updating of one of the predefined data structures is performed. The corresponding in-flux bit is reset in response to completing the update of the one of the predefined data structures. During recovery, the corresponding in-flux bits are checked to identify any unstable data structures.

16 Claims, 5 Drawing Sheets

5,951,699

METHOD AND APPARATUS FOR VERIFYING INTEGRITY OF PREDEFINED DATA STRUCTURES IN A COMPUTER SYSTEM

FIELD OF THE INVENTION

The present invention relates generally to the data processing field, and more particularly, relates to a method, apparatus and computer program product for verifying integrity of predefined data structures in a computer system.

DESCRIPTION OF THE PRIOR ART

In known computer systems in order to verify the integrity of various system and user data structures after a system failure, the system has to touch all the structures of interest. This touching or checking may include interrogation of persistent status indicators, if any in the structure, or running integrity checks on the structure itself, for example, verifying that linked-list chains are intact. These operations typically have caused a large number of page faults, as well as requiring significant processing time. Thus this processing adversely affected availability of the system, though it did indeed verify integrity of the affected structures. This processing was very expensive or time-consuming, because most structures' integrity was intact, and only a small number of structures needed to be rebuilt.

SUMMARY OF THE INVENTION

A principal object of the present invention is to provide an improved method, apparatus and computer program product for verifying integrity of predefined data structures in a computer system. Other important objects of the present invention are to provide such improved method, apparatus and computer program product substantially without negative effects and that overcome many disadvantages of prior art arrangements.

In brief, a method, apparatus and computer program product are provided for verifying integrity of predefined data structures in a computer system. A central software failure map is stored which includes for each of the predefined data structures a corresponding in-flux bit. The corresponding in-flux bit is set in response to a request to update one of the predefined data structures. Then updating of the one of the predefined data structures is performed. The corresponding in-flux bit is reset in response to completing the update of one of the predefined data structures. During recovery, the corresponding in-flux bits are checked to identify any unstable data structures.

BRIEF DESCRIPTION OF THE DRAWING

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
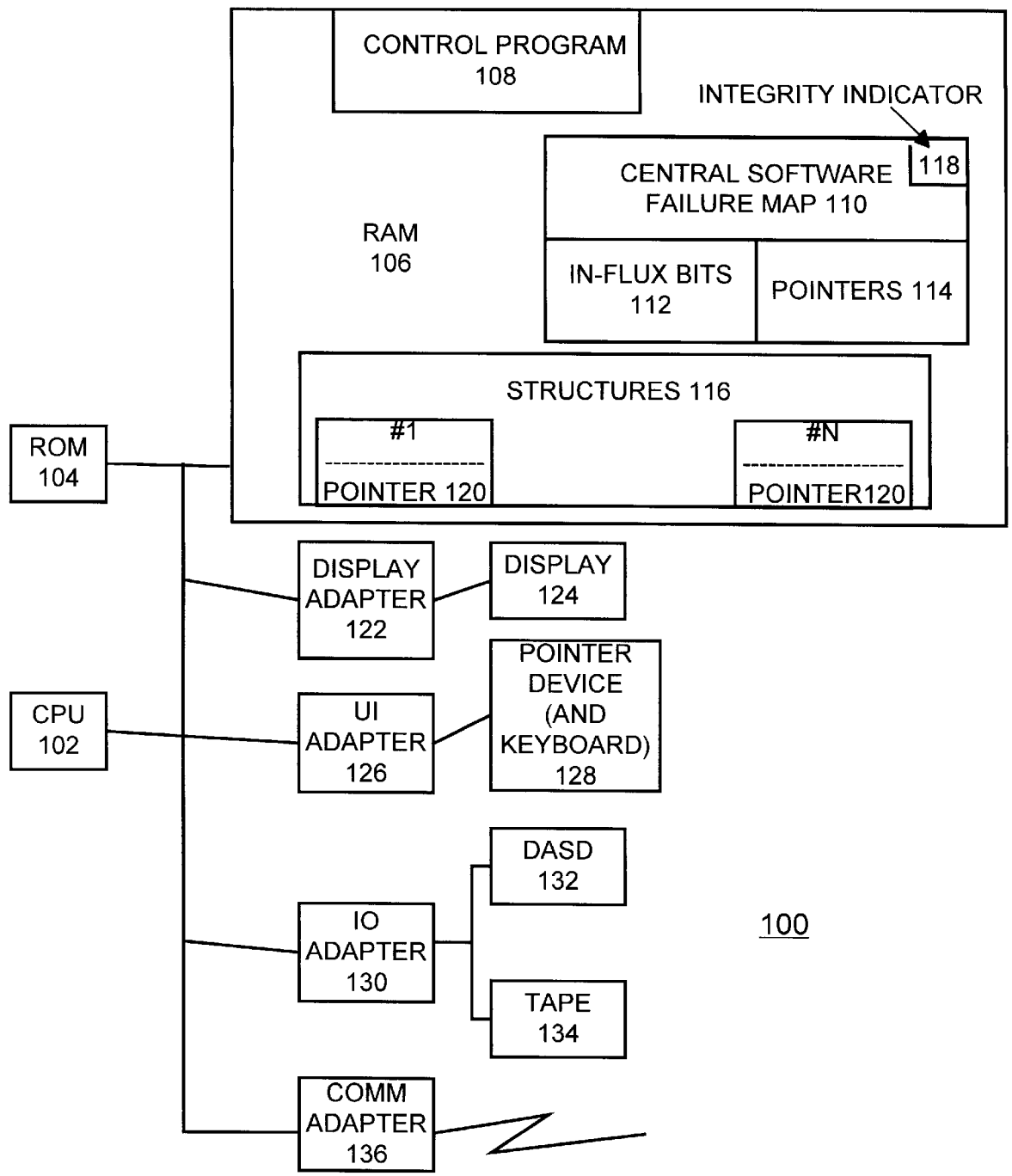
FIG. 1 is a block diagram representation of a computer or data processing system of the preferred embodiment.

Having reference now to the drawings, in FIG. 1, there is shown a computer or data processing system of the preferred embodiment generally designated by the reference character 100. As shown in FIG. 1, computer system 100 includes a central processor unit (CPU) 102, a read only memory (ROM) 104, and a random access memory (RAM) 106.

In accordance with features of the preferred embodiment, a control program 108 and a central software failure map 110 are stored in the RAM 106. The central software failure map 110 consolidates indicators or multiple in-flux bits 112 and pointers 114. The in-flux bits 112 show that various system and user structures (#1-#N) 116 are or are not in an unstable or an internally inconsistent state. A failure-map integrity indicator 118 shows whether the failure map's storage has been maintained successfully. The consolidation of data in the central software failure map 110 greatly reduces the page-faulting required to access all failure indicators after a failure of system 100. Within the central software failure map 110, multiple critical structures 116 including system structures and optionally user structures are assigned a location. The critical structures 116 contain pointers 120 to the central software failure map 110, while the pointers 114 within the central software failure map 110 point to the multiple critical structures 116. The central software failure map 110 implemented in high-speed storage 106 typically is persistent from time of a system failure through the time that the system 100 is operational again.

As shown in FIG. 1, computer system 100 includes a display adapter 122 coupled to a display 124. CPU 102 also is connected to a user interface (UI) adapter 126 connected to a pointer device and keyboard 128. Computer system 100 includes an input/output (IO) adapter 130 connected to the CPU 102 and connected to a direct access storage device (DASD) 132 and a tape unit 134. CPU 102 is connected to a communications adapter 136 providing a communications function.

Various commercially available processors could be used for computer system 100, for example, an IBM personal computer or similar workstation can be used. Central processor unit 102 is suitably programmed with control program 108 to execute the flowcharts of FIGS. 3 and 4, for maintaining the central software failure map 110 and verifying integrity of predefined data structures 116 in the computer system 100 of the preferred embodiment.

Figure 2:
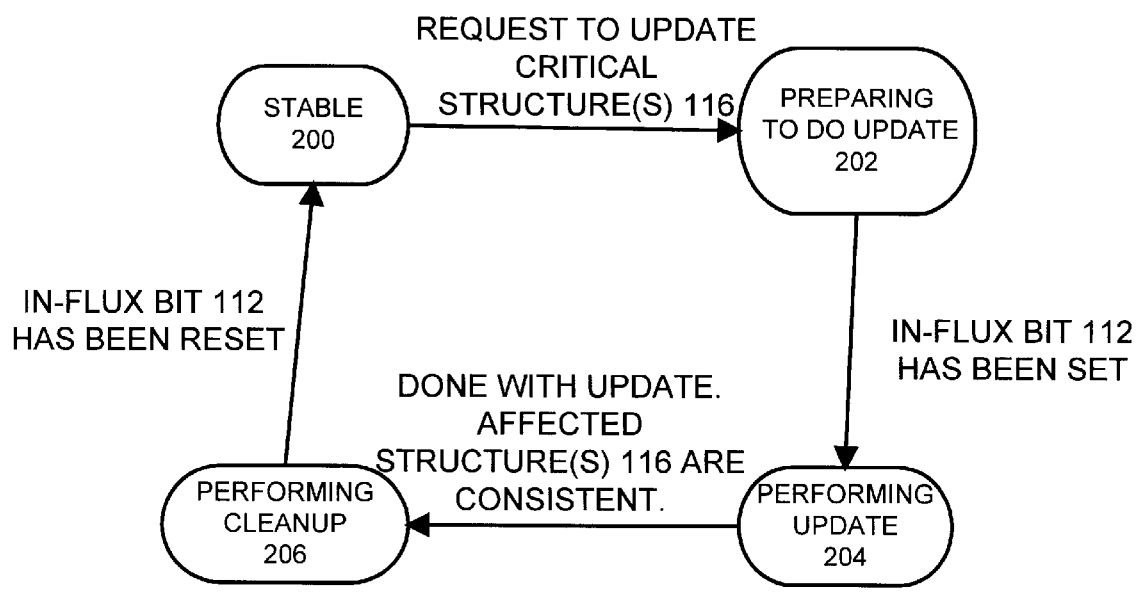
FIG. 2 is a functional block diagram illustrating state transitions illustrating the method and computer program product of the preferred embodiment.

Referring to FIG. 2, there are shown state transitions illustrating the method and computer program product of the preferred embodiment. In FIG. 2, a stable state is illustrated as indicated at a block 200. A next transition is indicated at a line labeled REQUEST TO UPDATE CRITICAL STRUCTURE(S) 116 to a preparing to do update state 202. The system sets its unstable indicator or the in-flux bit 112 is set for a particular critical structure 116 to be updated at block 202 before the particular critical structure enters an unstable state. An update is performed as indicated at an unstable state 204 labeled PERFORMING UPDATE. After a critical structure 116 leaves its unstable state as indicated at a line labeled DONE WITH UPDATE; AFFECTED STRUCTURE(S) 116 ARE CONSISTENT, then the critical structure enters a cleanup state 206 as indicated at a next state 206 labeled PERFORMING CLEANUP. Then the system resets its unstable indicator or the in-flux bit 112 is reset at state 206. Following the cleanup state 206, the system return to the stable state 200 as indicated at a line labeled IN-FLUX BIT 112 HAS BEEN RESET connected to the stable state 200.

Figure 3:
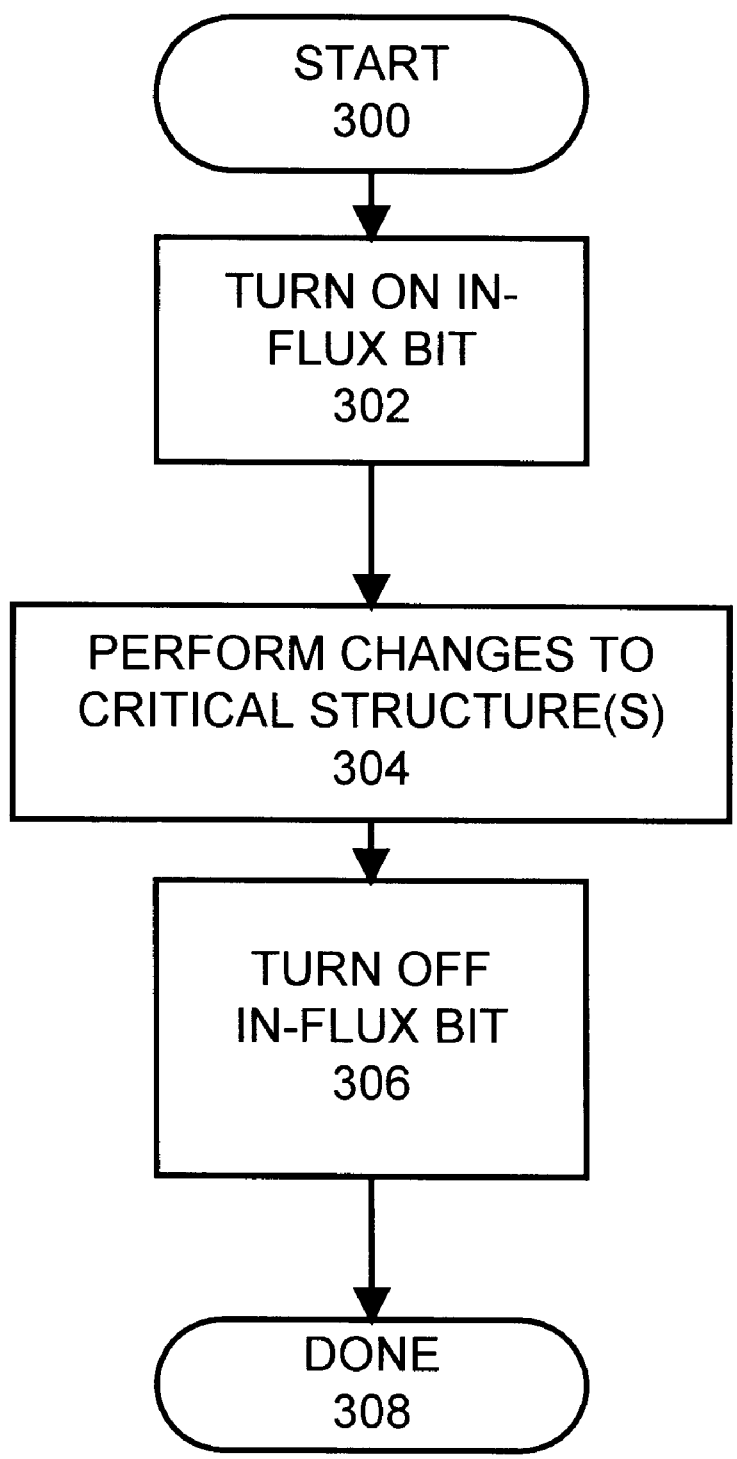
FIGS. 3 and 4 are flow diagrams illustrating the method and computer program product of the preferred embodiment.

Referring to FIG. 3, there are shown sequential steps in accordance with the control program 108 at run-time starting at a block 300. An in-flux bit 112 is turned on as indicated at a block 302. Then changes to a critical structure 116 are performed as indicated at a block 304. Next the in-flux bit 112 is turned off or reset as indicated at a block 306. This completes the sequential run-time operations as indicated at a block 308.

Figure 4:
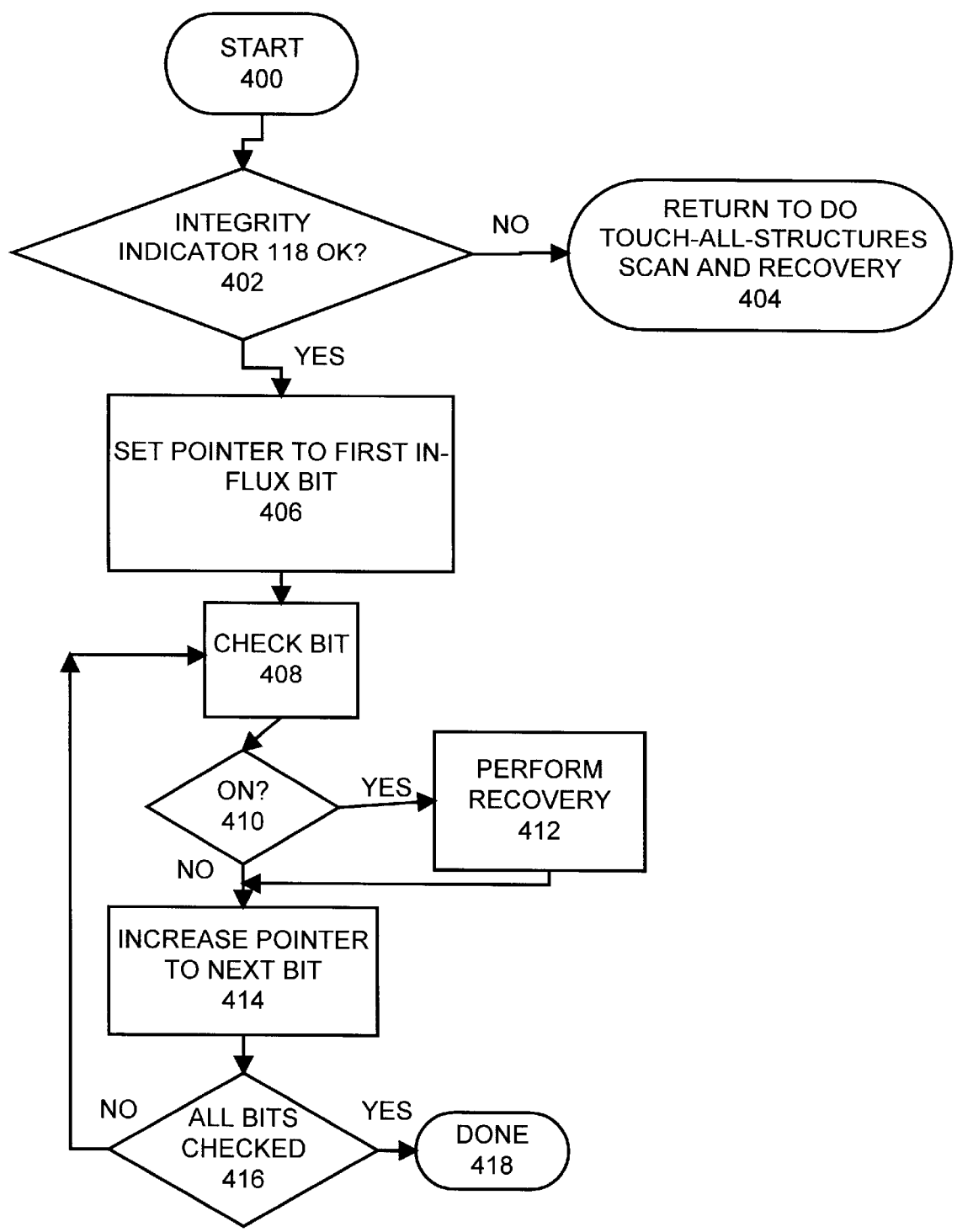

Referring to FIG. 4, there are shown sequential steps in accordance with the control program 108 at recovery starting at a block 400. When a failure occurs, first the failure map's integrity indicator 118 is checked as indicated at a decision block 402. If the failure-map integrity indicator 118 indicates that the failure map 110 cannot be trusted, then sequential operation return as indicated at a block 404 so that slower touch-all-critical-structure scans and detailed verification operations are performed and failures are detected on a structure by structure basis.

If the failure-map's integrity indicator 118 indicates that the failure map can be trusted, the failure map is scanned for unstable status of any structure 116. As indicated at a block 406 a pointer to the first in-flux bit is set and the in-flux bit is checked as indicated at a block 408. When determined as indicated at a decision block 410 that the in-flux bit is set or on, an unstable structure is indicated, then the pointer associated with that structure is consulted, and appropriate recovery or rebuild operations are performed as indicated at a block 412. Otherwise, the pointer is increased to the next in-flux bit 112 as indicated at a block 414. Checking whether all in-flux bits 112 have been checked is provided as indicated at a decision block 416. When all in-flux bits 112 have not been checked, then the sequential operations return to block 408 with checking the next in-flux bit 112. When all in-flux bits 112 have been checked, then the sequential recovery operations are completed as indicated at a block 418.

Figure 5:
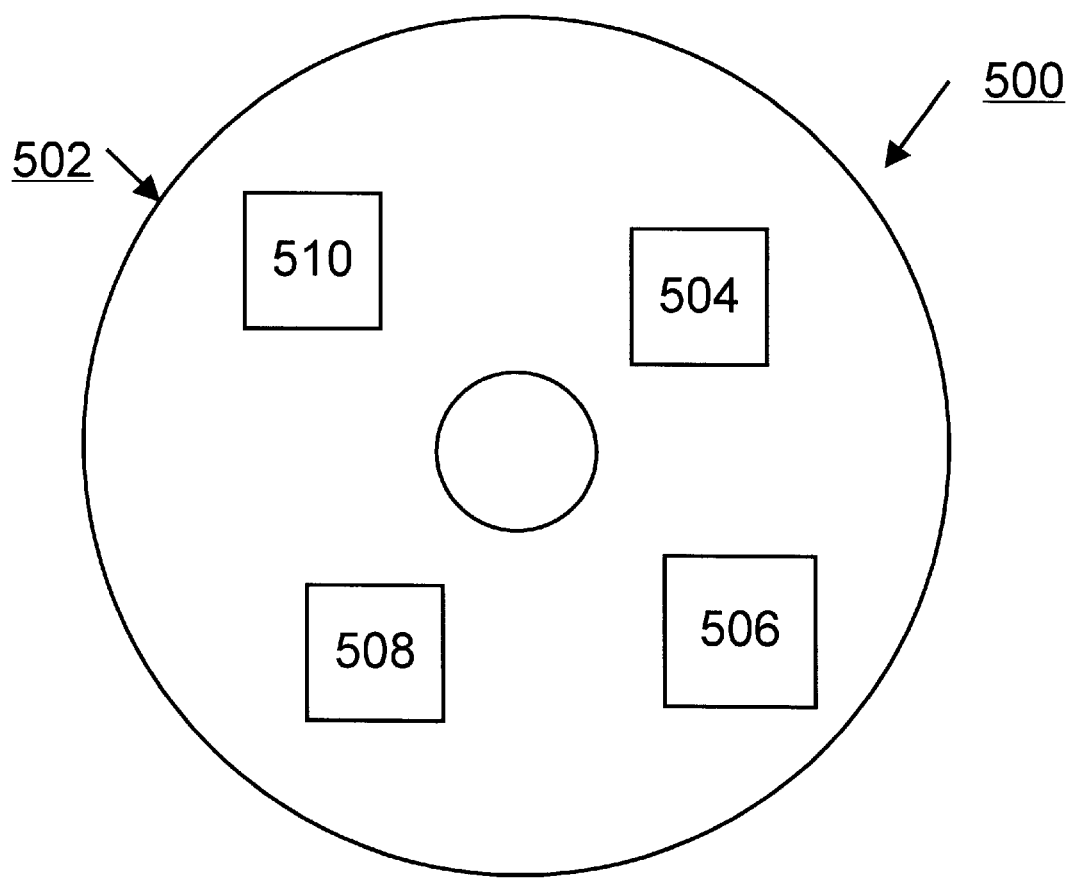
FIG. 5 is a block diagram illustrating a computer program product in accordance with the preferred embodiment.

Referring now to FIG. 5, an article of manufacture or a computer program product 500 of the invention is illustrated. The computer program product 500 includes a recording medium 502, such as, a floppy disk, a high capacity read only memory in the form of an optically read compact disk or CD-ROM, a tape, a transmission type media such as a digital or analog communications link, or a similar computer program product. Recording medium 502 stores program means 504, 506, 508, 510 on the medium 502 for carrying out the methods of the preferred embodiment in the system 100.

A sequence of program instructions or a logical assembly of one or more interrelated modules defined by the recorded program means 504, 506, 508, 510, direct the computer system 100 for maintaining the central software failure map 110 and verifying integrity of critical structures 116 of the preferred embodiment.

While the present invention has been described with reference to the details of the embodiments of the invention shown in the drawing, these details are not intended to limit the scope of the invention as claimed in the appended claims.

What is claimed is:

1. A method for verifying integrity of predefined data structures in a computer system comprising the steps of:

storing a central software failure map, said central software failure map including for each of the predefined data structures a corresponding in-flux bit;

setting said corresponding in-flux bit in said central software failure map in response to a request to update one of the predefined data structures;

performing the update of said one of the predefined data structures;

resetting said corresponding in-flux bit in said central software failure map in response to completing the update of said one of the predefined data structures; and during recovery, checking said corresponding in-flux bits in said central software failure map to identify any unstable data structures.

2. A method for verifying integrity of predefined data structures in a computer system as recited in claim 1 wherein the step of storing said central software failure map includes the step of storing said central software failure map in random access memory (RAM) in the computer system.

3. A method for verifying integrity of predefined data structures in a computer system as recited in claim 1 wherein the step of storing said central software failure map includes the step of storing a pointer to each of the predefined data structures within said central software failure map.

4. A method for verifying integrity of predefined data structures in a computer system as recited in claim 1 includes the step of storing a pointer to said central software failure map within each of the predefined data structures.

5. A method for verifying integrity of predefined data structures in a computer system as recited in claim 1 wherein the step of during recovery, checking said corresponding in-flux bits in said central software failure map to identify any unstable data structures includes the step of identifying an unstable data structure responsive to an identified set corresponding in-flux bit, said identified unstable data structure being associated with said identified set corresponding in-flux bit.

6. A method for verifying integrity of predefined data structures in a computer system as recited in claim 5 includes the step of performing recovery in the identified unstable data structure.

7. A method for verifying integrity of predefined data structures in a computer system as recited in claim 1 wherein the step of during recovery, checking said corresponding in-flux bits in said central software failure map to identify any unstable data structures includes the step of checking an integrity indicator for said central software failure map.

8. A computer program product for use in a computer system having a central processor unit for verifying integrity of predefined data structures in the computer system, the computer program product comprising:

a recording medium;

means, recorded on the recording medium, for storing a central software failure map, said central software failure map including for each of the predefined data structures a corresponding in-flux bit;

means, recorded on the recording medium, for setting said corresponding in-flux bit in said central software failure map in response to a request to update one of the predefined data structures;

means, recorded on the recording medium, for performing the update of said one of the predefined data structures;

means, recorded on the recording medium, for resetting said corresponding in-flux bit in said central software failure map in response to completing the update of said one of the predefined data structures;

means, recorded on the recording medium, during recovery, for checking said corresponding in-flux bits in said central software failure map to identify any unstable data structure.

9. A computer program product for use in a computer system having a central processor unit for verifying integrity of predefined data structures in the computer system as recited in claim 8 wherein said means, recorded on the recording medium, for storing said central software failure map includes means, recorded on the recording medium, for storing said central software failure map in random access memory (RAM) in the computer system.

10. A computer program product for use in a computer system having a central processor unit for verifying integrity of predefined data structures in the computer system as recited in claim 8 wherein said means, recorded on the recording medium, for storing said central software failure map include means, recorded on the recording medium, for storing a pointer to each of the predefined data structures within said central software failure map and means, recorded on the recording medium, for storing a pointer to each of the predefined data structures within said central software failure map.

11. A computer program product for use in a computer system having a central processor unit for verifying integrity of predefined data structures in the computer system as recited in claim 8 wherein said means, recorded on the recording medium, during recovery, for checking said corresponding in-flux bits in said central software failure map to identify any unstable data structures includes means, recorded on the recording medium, for checking an integrity indicator for said central software failure map.

12. A computer program product for use in a computer system having a central processor unit for verifying integrity of predefined data structures in the computer system as recited in claim 8 wherein said means, recorded on the recording medium, for checking said corresponding in-flux bits in said central software failure map to identify any unstable data structures includes means, recorded on the recording medium, for identifying an unstable data structure responsive to an identified set corresponding in-flux bit, said identified unstable data structure being associated with said identified set corresponding in-flux bit.

13. Apparatus for verifying integrity of predefined data structures in a computer system comprising:

a central software failure map stored in a random access memory of the computer system, said central software failure map including for each of the predefined data structures a corresponding in-flux bit;

control means for setting said corresponding in-flux bit in said central software failure map in response to a request to update one of the predefined data structures;

control means for performing the update of said one of the predefined data structures;

control means for resetting said corresponding in-flux bit in said central software failure map in response to completing the update of said one of the predefined data structures; and during recovery, control means for checking said corresponding in-flux bits in said central software failure map to identify any unstable data structures.

14. Apparatus for verifying integrity of predefined data structures in a computer system as recited in claim 13 wherein said central software failure map includes a corresponding pointer for each of the predefined data structures.

15. Apparatus for verifying integrity of predefined data structures in a computer system as recited in claim 13 wherein each of the predefined data structures are stored in the random access memory of the computer system and wherein each of the predefined data structures includes a pointer to said central software failure map.

16. Apparatus for verifying integrity of predefined data structures in a computer system as recited in claim 13 wherein said control means for checking said corresponding in-flux bits in said central software failure map to identify any unstable data structures include means for checking an integrity indicator for said central software failure map.

\* \* \* \* \*